MEANS FOR INSULATING SUPERCONDUCTING DEVICES

Filed March 19, 1962

INVENTORS
TED G. BERLINCOURT
RICHARD R. HAKE
BY
Gerald A. Koris
ATTORNEY

United States Patent Office
3,187,235
Patented June 1, 1965

3,187,235
MEANS FOR INSULATING SUPER-CONDUCTING DEVICES

Ted G. Berlincourt, Woodland Hills, and Richard R. Hake, Northridge, Calif., assignors to North American Aviation, Inc.

Filed Mar. 19, 1962, Ser. No. 180,686
7 Claims. (Cl. 317—158)

Figure 2:
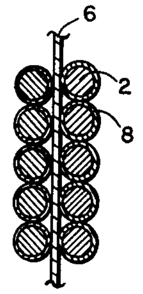

The present invention relates to improved superconducting coils and magnets, and more particularly to improved means for insulating superconducting devices.

Superconducting devices have opened a whole exciting new field of vast practical and theoretical importance. Superconductivity is the property of certain materials, at temperatures approaching absolute zero, to carry current without power dissipation. Such materials, at temperatures below a certain critical temperature, $T_c$, have no electrical resistivity, and therefore have no $I^2R$ losses. This phenomenon has been experimentally verified. Coils of such materials in liquid helium baths, with currents induced by withdrawing a permanent magnet from a position within the coil, have carried the resulting currents for periods of two years without any voltage drop. The factors controlling superconductivity of such materials are the interrelation of magnetic field strength H, critical current density $J_c$, and critical temperature $T_c$. The magnetic field strength, applied externally or generated by a current in the superconductor, limits superconductivity to below certain temperatures and current densities. Similarly, at a given field strength, an increase in temperature and/or current density can destroy superconductivity.

The large current-carrying capacity of superconductors provides the basis for very compact, superpowerful magnets which can be used in numerous applications where strong magnetic fields are required, for example, in lasers, masers, accelerators, and bubble chambers. It is calculated that the capital cost of a particular installation using such a magnet in place of a conventional electromagnet would be a factor of 100 less, and that the operating cost would be a factor of 80,000 less, due to the smaller physical size and the absence of power consumption or heat dissipation requirements for the magnet itself.

The phenomenon of superconductivity and the potential promise of superconducting materials is well known in the art (see, for example, Time magazine, March 3, 1961, p. 52, and Low Temperature Physics, Simon et al., Academic Press, pp. 95–132). A number of superconducting materials are known to the art, for example $Nb_3Sn$, and Nb–Zr alloy. See also U.S. Patent 2,866,842.

Superconducting devices display the tendency, for reasons not thoroughly understood, but believed to include application of excessive current or by local heating, to be on occasion driven "normal," that is, no longer superconducting, after which a superconducting condition can be re-established. This causes large induced voltage drops to appear across the superconducting magnet. The induced voltage is given by the expression $-LdI/dt$ where L is the inductance of the magnet, I is the current, and $t$ is the time. Since the currents are very large and the field collapses very rapidly, the induced voltages are extremely large, say in the order of 100,000 or more volts. Such voltage bursts are damaging to dielectric materials used as the insulation in superconducting coils or magnets.

Superconducting devices have utilized dielectric materials as insulators either around superconducting wire or as thin sheets between layers of windings. The dielectric materials are subjected to the destructive dielectric stresses arising from the large voltages when the superconductor is driven normal, and tend to shortly fail, causing short circuiting in the superconducting devices.

An object of the present invention, therefore, is to provide an improved superconducting device.

Another object is to provide a method of preventing short circuiting of superconducting devices by voltage surges caused by the devices going normal occasionally and destroying ordinary dielectric insulator configurations.

Still another object is to provide a superconducting device having an improved effective insulator between adjacent layers and between turns of a coil which is not subject to breakdown by large voltage surges.

A further object of the present invention is to provide a configuration for a superconducting device having a novel combination of effective insulating materials, not subject to breakdown.

Further objects and advantages of my invention will become apparent from the following detailed description and claims, taken together with the appended drawings.

Figure 1:
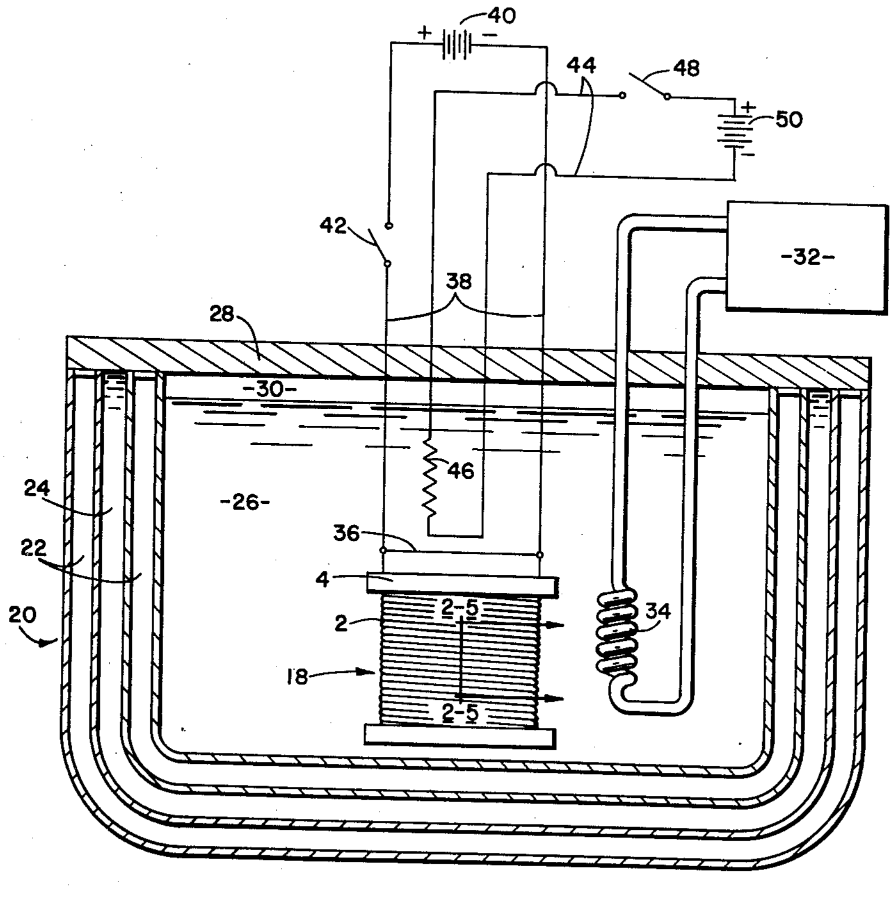

In the drawings, FIG. 1 is a schematic representation, partly in section, of a superconducting magnet apparatus; and FIGS. 2–5 are sections through the coil showing various embodiments of the present effective insulating means and arrangements.

As seen in FIGS. 2–5, the superconducting wire 2 is wound in a plurality of layers around a form 4 (FIG. 1). Sheets 6 of a normal metal, alloy, or semiconductor are disposed between adjacent layers. The term "normal" is used herein in its conventional sense to define a nonsuperconducting material which ordinarily conducts electricity and has measurable electrical resistivity at cryogenic temperatures.

Figure 3:
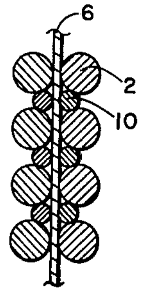
Figure 4:
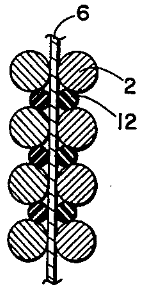
Figure 5:
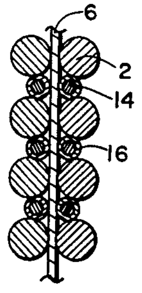

Further, adjacent turns within a given layer are insulated from each other by the means shown in the various figures. In FIG. 2 the superconducting wire is coated with a normal metal 8, such as copper, silver, gold, or nickel, by such conventional means as electroplating or coextrusion, such that the normal wire serves as a spacer between adjacent turns of the superconducting wire. In FIG. 3 the coil is constructed by winding bare superconducting wire 2 together with bare normal wire 10; the normal wire then acts as a spacer between turns of the superconducting wire. In FIG. 4 the bare superconducting wire is wound together with a dielectric insulating filament 12, the insulating filament serving as a spacer between turns of the superconducting wire. In FIG. 5 bare superconducting wire 2 is wound together with a normal wire 14 having a dielectric insulator coating 16 such that the insulated normal wire is a spacer between turns of the superconducting wire. Thus, by separating adjacent layers of windings with a sheet of normal metal, and adjacent turns within a given layer by any normal metal or a dielectric material, or a combination of both, the problems hereinbefore encountered with dielectric insulators are overcome.

The adjacent layers are separated in each embodiment by thin sheets of normally conductive materials, which ordinarily function as electrical conductors rather than as insulators. Such materials do not undergo the breakdown caused by voltage surges upon the superconducting device occasionally going normal, that is, non-superconducting for a short period, and therefore the life and efficiency of the superconducting device is considerably lengthened. The seemingly anomalous behavior of ordinarily excellent conductors, such as copper, in functioning as insulators in a superconducting device is explained on the basis that in comparison with superconducting wire, which has no electrical resistivity, the normal metal represents an infinite resistance, and therefore no current passes therethrough. Any normal metal or alloy which can be fabricated into suitably thin sheets, on the order of a few mils thick, can effectively function as an insulating material between adjacent layers of superconducting wire. Similarly, any semiconducting material in thin sheets may be used.

The adjacent turns of superconducting wire in a given layer are separated to prevent formation of superconducting shorted loops in the windings. With shorted loops, the resulting field shielding and trapping causes reproducible hysteresis in the magnetic field versus current characteristics of the coil. For example, in a given magnet having shorted loops, reduction of the current from any value above about 5 amp. to zero results in a steady state trapped field of about 2.5 kilogauss. Such hysteresis effects may be avoided in the manner provided by the present invention. In FIG. 2 adjacent turns are separated by the normal coatings on each superconducting wire, and in FIG. 3 bare superconducting wire turns are separated by turns of a normal metal. The superconducting and normal wires may be wound on the core together in a bifilar winding.

When a dielectric material is used to insulate adjacent turns of superconducting wire in a given layer, as in FIGS. 4 and 5, in combination with sheets of normal metal disposed between adjacent layers, the dielectric material is not subject to the same high stresses upon the device going normal, as in the case when dielectric material is used alone. This is because the normal metal between layers provides a low impedance path for the high induced currents, thus preventing high voltage build-up in the dielectric material between turns. An advantage of using dielectric-coated normal wire insulator (FIG. 5) is the ready availability of such wire. Further, due to the transformer action of such a configuration, part of the stored magnetic energy can be dissipated outside the cryostat in event of superconducting-to-normal transition. This serves to lower refrigeration requirements.

Another advantage of using dielectric insulation between adjacent turns of superconducting wire in a given layer, in combination with normal metal between layers, is to lower the time constant for the magnetic field to follow an adjustment in outside current, relative to the constant for normal metal insulation between turns. The time constant is given by the expression $L/R$, where L is inductance and R is resistance. If upon a current change, the current follows a resistive rather than an inductive path (i.e., flows in the normal metal insulator rather than the superconducting wire), the magnetic field of the coil lags the change in current. Therefore, having a relatively high resistance value, such as is provided by the combination of normal metal and dielectric material, the time constant is shortened (over that for normal metal alone) and the magnetic field follows changes in current more rapidly. Further, voltage drops in the normal metal for a low resistance coil insulated only with normal metal can cause heat generation which may cause the superconducting device to go normal. In any event, hysteresis effects are reduced when adjacent turns in a layer are separated with a normal metal in contrast with the case where adjacent turns of bare superconducting wire contact each other. Therefore, any of the embodiments shown in FIGS. 2–5 for insulating adjacent turns of wire in a given layer provide improved performance.

Reference is made to FIG. 1 for an illustration of a specific magnet device using the present winding and insulation arrangement. Any number of magnet and coil arrangements may of course be devised by those skilled in the art, and the particular design will be considerably influenced by the proposed use of the superconducting device. The magnet assembly 18 is positioned in a double walled Dewar flask 20 having two vacuum regions 22 with an intermediate region 24 containing liquid nitrogen. Other thermally insulated containers may be used. The vessel is filled with liquid helium 26 and separated from the environment by suitable enclosure means 28. The space 30 between the liquid helium and the cover is filled with helium gas. The temperature of the bath is maintained by a refrigerator system 32 having a cooling coil 34 which accurately maintains temperatures between 1–10° K. The magnet 18 consists of superconducting wire 2, such as niobium-25 atom percent zirconium alloy, wound about a spool 4 with sheets of normal metal positioned between adjacent layers of turnings. The spool may be of a normal metal or an organic resin such as a phenolic resin. A superconducting bridge or switch 36 is positioned across the magnet coil. Ordinary conducting wires 38 connect the magnet to an external battery 40 and switch 42, leaving the superconducting switch in parallel across the magnet in the circuit. A second circuit using ordinary wire 44 also enters the flask. It has a resistance heater element 46 adjacent the superconducting switch, and an external on-off switch 48 and battery 50.

The operation of the system is as follows. Switches 42 and 48 are closed, thereby producing current flow in both circuits. The heater element 46 next to superconducting switch 36 provides just sufficient heat to raise its temperature above $T_c$, thereby directing all current flow in the circuit through the magnet. The switches are then opened, and the field around the magnet tries to decay. Since the heater element is off, the switch now becomes superconducting and a new electrical circuit consisting entirely of the superconducting wire is established. The use of the superconducting switch is not necessary; current can continually be supplied from an external circuit, with power consumption occurring only in the external circuit.

As there are no power losses in this magnet circuit (the voltage drop in the initial circuit with the switch closed, required to satisfy Kirchhoff's law, is in the external circuit) a permanent magnet effect is obtained and no further power is required to sustain the magnetic field. The field strength and direction of the resulting magnetic field outside the container is conventionally determined. Therefore, after the magnet is once energized, both external battery circuits can be removed. The only continuing power requirement is that of the refrigerator operator system necessary to maintain the temperature of the helium bath. However, this is an extremely tiny fraction of the power requirements of a conventional electromagnet of equivalent field strength where large wattages are dissipated in the magnet, and where additional power is consumed in cooling devices.

A superconducting solenoid is designed for a selected field strength, according to the formula $$H_0=1.26\lambda jt$$

where $H_0$ is the axial field, in gauss, at the center of an infinitely long air-core solenoid, $\lambda$ is the filling factor, $j$ is the current density in the conducting part of the windings in amp/cm.$^2$, and $t$ is the winding thickness in cm. This equation is a good approximation for most solenoid designs providing that the ratio of length to average diameter is greater than $\sim 3$.

It is apparent from the foregoing that the present invention is subject to different embodiments and configurations. Therefore, the invention should be understood to be limited only as is indicated in the appended claims.

We claim:

1. In a superconducting electromagnet comprising a coil wound on a magnet form, the coil having a plurality of layers of superconducting wire with each layer having a plurality of adjacent turns of said wire, wherein when said magnet in an energized superconductive state goes to a normally conductive state, substantial voltage stresses occur ordinarily damaging to dielectric material present for providing insulation between adjacent coil layers of the magnet, whereby the life of the magnet is shortened, the improvement for increasing magnet life and efficiency comprising a thin sheet of normally conductive material positioned between said adjacent coil layers, and means separating said adjacent turns of superconducting wire to electrically insulate these turns from each other.

2. The device of claim 1 wherein said means separating said adjacent turns is a wire of a normally conductive material wound between said turns of superconducting wire.

3. The device of claim 2 wherein said normally conductive material is selected from the class consisting of metals, metallic alloys, and semiconductors.

4. In a superconducting electromagnet comprising a coil wound on a magnet form, the coil having a plurality of layers of superconducting wire with each layer having a plurality of adjacent turns of said wire, wherein when said magnet in an energized superconductive state goes to a normally conductive state, substantial voltage stresses occur ordinarily damaging to dielectric material present for providing insulation between adjacent coil layers of the magnet, whereby the life of the magnet is shortened, the improvement for increasing magnet life and efficiency comprising a thin sheet of normally conductive material positioned between said adjacent coil layers, and a wire of normally conductive material wound between said turns of superconducting wire to electrically insulate said turns of superconducting wire from each other, wherein said wire of normally conductive material is provided with a dielectric coating.

5. The device of claim 1 wherein said means separating said adjacent turns is a wire of a dielectric material wound between said turns of superconducting wire.

6. The device of claim 1 wherein said means separating said adjacent turns is a coating of normally conductive material upon said superconducting wire.

7. The device of claim 6, wherein said normally conductive material is selected from the class consisting of metals, metallic alloys, and semiconductors.

References Cited by the Examiner

UNITED STATES PATENTS

| | | | |
|---|---|---|---|
| 2,935,694 | 5/60 | Schmitt et al. | 174—15 |
| 3,056,889 | 10/62 | Nyberg | 307—88.5 |
| 3,109,963 | 11/63 | Geballe | 317—158 |

OTHER REFERENCES

Tannenbaum et al.: "Superconductors," Interscience Publishers, Feb. 18, 1962, paper by Betterton et al., pages 61 and 65.

Din et al.: Low-Temperature Techniques, published by George Newnes Ltd., London, 1960, pp. 133–142.

JOHN F. BURNS, *Primary Examiner.*

JOHN P. WILDMAN, *Examiner.*